No. 666,424. Patented Jan. 22, 1901.
F. E. IVES.
COLOR PHOTOGRAPHY.
Application filed Nov. 27, 1899.
(No Model.)
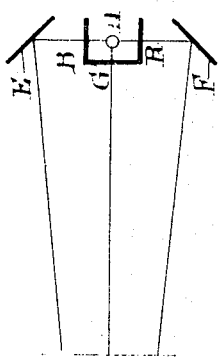
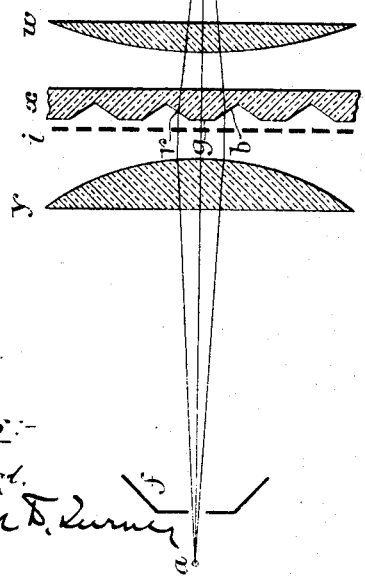
Witnesses:-
Inventor:-
Frederic E. Ives.
by his Attorneys
THE NORRIS PETERS CO., PHOTO-LITHO., WASHINGTON, D. C.

UNITED STATES PATENT OFFICE.

FREDERIC EUGENE IVES, OF PHILADELPHIA, PENNSYLVANIA.

COLOR PHOTOGRAPHY.

SPECIFICATION forming part of Letters Patent No. 666,424, dated January 22, 1901.

Application filed November 27, 1899. Serial No. 738,420. (No specimens.)

*To all whom it may concern:*

Be it known that I, FREDERIC EUGENE IVES, a citizen of the United States, residing in Philadelphia, Pennsylvania, have invented certain Improvements in Color Photography, of which the following is a specification.

My invention relates to that form of composite color photography in which the photographic color-record is a single image, which may be described as a linear or otherwise mechanically divided mosaic of the three or more images which constitute the color-record in other forms of the composite process.

The object of my invention is to provide a simpler, cheaper, and more permanent means of color synthesis than is afforded by the surface of lines ruled or printed in colored inks as heretofore employed in combination with the linear or mosaic color-record.

In the process as now practiced the photographs are usually made by exposure through a linear selective color-screen of lines approximately red, green, and blue in color, these lines adjoining and succeeding each other regularly across the surface of a glass plate. The result is a negative which should show in each line that has been exposed under either one of the colors such a degree of opacity as is required to suitably distribute the corresponding primary color in the final synthesis. For instance, a bright-red object will be fully exposed and the negative opaque only in those parts exposed under the red lines, a bright-yellow object in those parts exposed under both red and green lines, because a mixture of both red and green light represents the yellow in the final synthesis, while white objects will be equally dense under all three lines. The same kind of negative can be made by successive exposures under a screen having alternate opaque and clear spaces, the clear spaces being equal to one-third of the total area, the ruled screen being moved between the exposures and the selective color-screens being changed at each exposure, so that one exposure secures a linear representation of the red element, another secures a linear representation of the green element, and a third secures a linear representation of the blue element. From the negative color-record a positive print is made, preferably on a glass plate, and in order to reproduce the colors of the object photographed the positive is viewed by light passing through a screen ruled in pure red, green, and blue lines, with the red lines covering the linear record of the red, the green lines covering the linear record of the green, and the blue lines covering the linear record of the blue, the result being that at such a distance that the lines are not separately perceived an apparently structureless photographic image in the natural colors will appear. A serious practical objection to this method of synthesis is the fact that sufficiently-perfect rulings or printings of the colored lines are very difficult to obtain and when obtained are not permanent, because of the fugitive nature of such colors as it has been found necessary to employ. I propose to obviate this defect by substituting for the viewing-screen having colored lines a screen made up of three series of colorless prismatic lines or two series of prismatic lines and one of plane surfaces and to use three separate and differently-colored sources of light so placed that the lines over the red, green, and blue elements of the photograph refract or transmit to the eye only the correspondingly-colored light. The best theoretical conditions for carrying out this idea involve the use of three separate but sufficiently powerful sources of illumination—red, green, and blue—with a separation equal to, say, three degrees of arc from the observer and at a sufficient distance to make all of the utilized rays from either source of light approximately parallel to each other as they strike the viewing-screen.

In the accompanying drawings, Figure 1 is a diagram illustrating my invention, and Figs. 2, 3, and 4 are views illustrating various forms of prismatic viewing-screens made in accordance with my invention.

In Fig. 1, A represents a lamp or other source of light, which is shielded on three sides by a screen having blue, green, and red sides represented, respectively, at B, G, and R, so that the rays of light transmitted through this screen will be correspondingly colored on issuing therefrom. Diagonal mirrors E and F reflect the blue and red rays forwardly.

The prismatic screen $x$ (shown in Fig. 1) has plane or flat surfaces $g$, flanked by prismatic surfaces $r$ and $b$, and the rays of green light are incident perpendicularly upon the plane or flat surfaces $g$ of the screen and pass through the same without being bent or refracted; but the rays of red light are refracted by the prismatic surfaces $r$ and are thereby bent so as to issue from the screen parallel with the green rays, and in like manner the rays of blue light are refracted by the prismatic surfaces $b$ and are thereby bent so as also to issue from the screen parallel with the green rays.

If the lights are not sufficiently distant to make the incident light-rays from each source of light practically parallel across the whole screen, a convex lens should be inserted at $w$, the focus of which lens should be equal to the distance of the sources of light, and a convex lens at $y$ may be made to converge the parallel rays issuing from the screen to a focus upon the eye at $a$, when the screen will appear to be made up of alternate series of red, green, and blue lines and will be optically equivalent to the viewing-screen ruled with colored lines as heretofore employed.

All light-rays not proceeding from the prismatic screen in parallel lines will fall well outside of the focal point $a$ and may be screened off by means of a diaphragm having an aperture concentric with the cone of rays, as shown at $f$.

The linear positive photographic record is placed in contact with or approximate to the prismatic screen, as indicated, for instance, by dotted line $i$ in Fig. 1, in such a manner that the lines representing the red element register with the prismatic surfaces $r$, the lines representing the green element register with the plane surfaces $g$, and the lines representing the blue element register with the prismatic surfaces $b$, whereupon the optical result as seen from the point $a$ will be the same as when the photograph is viewed through the screen having colored lines; but by the use of the prismatic screen it is practicable to produce many more lines to the inch than when the screen is ruled with colored lines. Hence said lines are not so aggressively evident to the eye.

The prismatic viewing-screen may have different cross-sectional forms, three of such forms being indicated, respectively, in Figs. 2, 3, and 4.

The prismatic screen shown in Fig. 2 has double prisms separated by plane surfaces, the screen shown in Fig. 3 has pairs of prisms of different size separated by plane surfaces, and the screen shown in Fig. 4 is wholly prismatic—that is to say, it has no plane surfaces.

The form of screen shown in Fig. 2 is perhaps the easiest to produce, it being necessary only to rule separate V-shaped lines in a metal plate and use the same as a matrix for molding the screen in gelatin upon glass, as in Woodbury-type printing.

The depth of the prisms is within wide limits immaterial, as the separation of the three sources of light can be regulated to make the different-colored rays emerge parallel to each other on the other side of the screen; but in practice the prisms are made much shallower than is indicated in the drawings. In fact, all of the prismatic screens shown are enormously exaggerated, no attempt having been made to show the proper proportions of the different elements of the drawings.

The character of the prisms will be determined largely by the angular separation of the sources of light. For instance, if these sources of light are separated by three degrees of arc three-degree prisms should be employed to give the best result.

The prismatic screen may be made a fixed part of the viewing device and used for viewing any number of the positive photographic color-records by placing the latter with their lines in proper registry with the lines of the screen.

Theoretically it is immaterial whether the photographic color-record is placed between the prismatic screen and the source of light or between the screen and the eye; but in either case the color-record should, in order to get the best result, be placed close to the screen.

Each face of each group of three faces, constituting what may be termed a "single element of the prismatic screen," will receive rays of light from each of the sources of light; but owing to the separation of said sources of light the angle of the rays reaching each face of the group will vary to such an extent that only the one desired ray will be refracted forwardly in the proper direction to be condensed by the lens $y$ and passed through the aperture of the diaphragm $f$, the other rays falling outside of the line of vision, and hence having no effect upon the eye of the observer.

Having thus described my invention, I claim and desire to secure by Letters Patent—

1. As a means of imparting the proper colors to the color-records of a photographic image, a series of appropriately-colored sources of illumination and a transparent screen receiving the light-rays therefrom and composed of elements each formed to parallelize differently-colored rays transmitted therethrough.

2. As a means of imparting the proper colors to the color-records of a photographic image, appropriately-colored sources of illumination and a screen receiving the light-rays therefrom, said screen presenting both plane and prismatic surfaces.

3. As a means of imparting the proper colors to the color-records of a photographic image, appropriately-colored sources of illumination, a transparent screen receiving the light-rays therefrom and composed of elements each formed to parallelize differently-colored rays transmitted therethrough, and a lens interposed between said sources of illumination and the screen.

4. As a means of imparting the proper colors to the color-records of a photographic image, appropriately-colored sources of illumination, a transparent screen receiving the light-rays therefrom and composed of elements each formed to parallelize differently-colored rays transmitted therethrough, and a lens interposed between the screen and the point of view.

5. As a means of imparting the proper colors to the color-records of a photographic image, appropriately-colored sources of illumination, a transparent screen receiving the light-rays therefrom and composed of elements each formed to parallelize differently-colored rays transmitted therethrough, a lens interposed between said sources of illumination and the screen, and a lens interposed between said screen and the point of view.

6. As a means of imparting the proper colors to the color-records of a photographic image, appropriately-colored sources of illumination, a transparent screen receiving the light-rays therefrom and composed of elements each formed to parallelize differently-colored rays transmitted therethrough, a lens interposed between said screen and the point of view, and a diaphragm interposed between said point of view and said lens.

7. As a means of imparting the proper colors to the color-records of a photographic image, a source of light, appropriately-colored screens and mirrors whereby differently-colored rays of light derived from the one source are projected forwardly, and a transparent screen interposed in the path of said colored-light rays and composed of elements each formed to parallelize differently-colored rays transmitted therethrough.

8. The combination, in juxtaposition, of a linear color-record and a transparent prismatic line screen, substantially as specified.

In testimony whereof I have signed my name to this specification in the presence of two subscribing witnesses.

FREDERIC EUGENE IVES.

Witnesses:
F. E. BECHTOLD,
JOS. H. KLEIN.